(12) United States Patent
Klein et al.

(10) Patent No.: US 6,178,426 B1
(45) Date of Patent: *Jan. 23, 2001

(54) APPARATUS WITH EXTENDED MARKUP LANGUAGE DATA CAPTURE CAPABILITY

(75) Inventors: John Raymond Klein, Morgan Hill, CA (US); Joel Kahn, Rockville Centre, NY (US)

(73) Assignee: Symbol Technologies, Inc., Holtsville, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/007,744

(22) Filed: Jan. 15, 1998

(51) Int. Cl.[7] .................................................. G06F 17/00
(52) U.S. Cl. ........................ 707/102; 707/104; 707/103; 235/462
(58) Field of Search ................................... 235/380, 462, 235/462.1, 375; 382/185; 395/839; 345/339; 707/513, 103, 102, 104; 705/23, 26

(56) References Cited

U.S. PATENT DOCUMENTS

| | | | |
|---|---|---|---|
| 5,294,782 | 3/1994 | Kumar | 235/462 |
| 5,334,823 * | 8/1994 | Noblet, Jr. et al. | 235/380 |
| 5,371,348 | 12/1994 | Kumar et al. | 235/472 |
| 5,386,106 | 1/1995 | Kumar | 235/462 |
| 5,521,369 | 5/1996 | Kumar | 235/472 |
| 5,548,477 | 8/1996 | Kumar et al. | 361/680 |
| 5,548,478 | 8/1996 | Kumar et al. | 361/681 |
| 5,604,516 | 2/1997 | Herrod et al. | 345/168 |
| 5,616,906 | 4/1997 | Kumar | 235/462 |
| 5,632,373 | 5/1997 | Kumar et al. | 206/305 |
| 5,638,257 | 6/1997 | Kumar et al. | 361/680 |
| 5,648,760 | 7/1997 | Kumar | 340/825 |
| 5,665,951 * | 9/1997 | Newman et al. | 235/375 |
| 5,742,705 * | 4/1998 | Parthasarathy | 382/185 |
| 5,878,276 * | 3/1999 | Aebli et al. | 395/839 |
| 5,880,724 * | 3/1999 | Bertram et al. | 345/339 |
| 5,893,915 * | 4/1999 | Cordell et al. | 707/513 |
| 5,905,248 * | 5/1999 | Russell et al. | 235/462 |
| 5,971,277 * | 10/1999 | Cragun et al. | 235/462.01 |
| 5,978,773 * | 11/1999 | Hudetz et al. | 705/23 |
| 6,064,979 * | 5/2000 | Perkowski | 705/26 |

FOREIGN PATENT DOCUMENTS

11110317 * 4/1999 (JP) .

OTHER PUBLICATIONS

Spectrum24 Wireless LAN, Symbol, product information, 5 pgs, May 1997.
PPT 4500 Series, Portable Pen Terminals, Symbol, product information, Oct. 1997.
Spectrum24 Pager, Instant Response to Critical On–site Communications, Symbol, product information, Sep. 1997.
PDT 3200 Series, Portable Data Terminals, Symbol, product information, Sep. 1997.
Dave Raggett, "Inserting Objects into HTML," W3C Reports, WWW Journal, pp. 29–41, Apr. 22, 1996.

* cited by examiner

*Primary Examiner*—Wayne Amsbury
*Assistant Examiner*—Thuy Pardo
(74) *Attorney, Agent, or Firm*—Fish & Richardson P.C.

(57) ABSTRACT

A computer implemented apparatus captures data from a user into a form specified in accordance with a markup language such as hypertext markup language. The user selects a data type such as text, handwriting, voice, image and video data type to be captured. Once the user indicates the type of data to be captured, the apparatus enables a transducer associated with the selected data type to capture data. The apparatus also formats data from the transducer into a predetermined format, stores and displays the formatted data in the markup language form.

26 Claims, 10 Drawing Sheets

APPARATUS WITH EXTENDED MARKUP LANGUAGE DATA CAPTURE CAPABILITY

BACKGROUND OF THE INVENTION

The present invention relates to an apparatus and a method for capturing data into a markup language data entry form, and more particularly, to an apparatus and a method for capturing data such as magnetically encoded card data, hand stroke data, voice data, image data and video data into an input field of a markup language.

Rapid advances in electronics have given rise to powerful mobile computers capable of performing tasks reserved for minicomputers of the past. The power of these mobile computers is further enhanced by advances in telecommunications technology which enable these mobile computers to communicate with each other and to access data in an untethered manner. In these systems, when one mobile computer sends a message to another computer, the message is sent as a sequence of data packets onto a communication system. Typically, the communication system is divided into a number of links. A link may be a local area network (LAN) which is capable of supporting a few hundred nodes where computers may be attached. The LANs are connected together by a number of different standard devices which forward the packets to their destination. Other types of link in a communication system may include a wide area network (WAN) formed by joining other links such as LANs, or by directly joining computers in a point-to-point connection.

Concurrent with the rise of mobile computing is a phenomenon known as networking. A global network known as the Internet is an increasingly popular medium for communicating and publishing widely accessible documents. A network of networks, the Internet transfers information using a common protocol called Hyper Text Transfer Protocol (HTTP) which tells computers connected to the network how to locate and exchange files with one another. HTTP is a stateless protocol designed to transfer documents at a fast rate. Stateless systems do not remember any information from one document transfer to the next, or from one connection to another. If any other documents or files are needed, a new connection must be opened between computers, any request and response made, and a connection closed.

An important class of documents communicated over the Internet conform to a Hyper Text Markup Language (HTML) that a World-Wide-Web (WWW or Web) client browser can translate and display. Once posted on a Web server, these documents or compilations of pages can be retrieved and viewed by anyone who has access to the Internet and a browser on their client computer. As a global communications system, the Internet is a natural complement to mobile computers which may need to send and receive data from anywhere in the world.

In a separate trend, to minimize investments in time required to learn how to use software applications running on the mobile computers, each software application is typically provided with a graphical user interface. The graphical use interface provides simple interactive tools for an input, a manipulation and a display of data as well as program execution control through the use of windows, icons, menus, toolbars, scrollbars, command buttons, option buttons, text input boxes, dialog boxes and the like. By providing a graphical user interface, the applications allow a user to run the application intuitively and with minimum or no training at all. Particularly, the graphical user interface displayed on desktop browsers such as Netscape Navigator, available from Netscape Communications Corporation, or Internet Explorer, available from Microsoft Corporation, is a familiar interface which is easy to learn. Therefore, it is desirable to apply the browser user interface paradigm to applications running on the mobile computers.

The browser user interface is typically specified using a mark up language such as HTML. Each HTML document is essentially a collection of HTML codes or tags which provide the document with a general structure of a head and a body, as well as headings, format controls, forms, tables, and one or more element types. The head contains a title, while the body contains information actually displayed. The body can be made up of a number of elements such as texts, images, sound clips and tags for forming controls, lists, tables, frames, layers, and others. Typically, each HTML tag is specified by a left angle bracket (<), a tag name, and a right angle bracket (>). Tags are usually paired, for example <HTML> and </HTML>, to start and end the tag instruction. The end tag resembles the start tag except a slash (/) precedes the text within the brackets. The adoption of the HTML language as a standard allows hypertext documents to be easily created. Further, when viewed with HTML browsers, these documents are displayed with a degree of consistency across a wide range of machines.

In many applications where pre-encoded data may already exist such as data resident on a card, a parcel package, a product label, or a shelf tag, it may be desirable to automatically capture the data. Additionally, it may be desirable to manually enter data using a keyboard directly into the application if the bar code or magnetic stripe code is damaged and unreadable. For these applications, the current HTML language requires custom software to handle automatic data capture devices.

As HTML language was originally designed for authors to turn a simple text document into a hypertext document for the World Wide Web, HTML lacks support for automated data capture and display in HTML input fields. Such automated data capture capability is important for applications such as inventory control, manufacturing control, and point of sale data capture, among others. Heretofore, in the event an application is written in HTML needs to capture data from various automatic data collection devices, developers were required to develop custom routines and code on a case by case basis. This process is time consuming, tedious and costly.

SUMMARY OF THE INVENTION

A computer implemented apparatus captures data from a user into a form specified in accordance with a markup language such as Hypertext Markup Language. The user selects a data type such as text, handwriting, voice, image and video data type to be captured. Once the user indicates the type of data to be captured, the apparatus enables a transducer associated with the selected data type to capture data. The apparatus then formats data from the transducer into a predetermined format, stores and displays the formatted data in the markup language form.

The transducer may be a magnetic stripe reader for capturing magnetically encoded data. It may also be a graphics tablet for capturing handwriting data. The transducer may also be a microphone for capturing audio data. The transducer is a camera for capturing either images or video sequences.

In one aspect, the apparatus determines whether the data received is error-free and if not, generates a failure warning to a user. The warning may include playing a first tone to indicate the failure and a second tone to indicate success.

In another aspect, the apparatus collects handwriting and other user strokes. During the user stroke data collection, the apparatus compresses the captured data by deleting duplicate points in the user strokes before storing the strokes. Moreover, the apparatus stores deltas between previous and current user strokes.

In yet another aspect, the form has a clear stroke area to allow the user the option of clearing previous writings. When the user actuates this area, previously stored user strokes are deleted.

Advantages of the invention include the following. The invention provides an ability to capture multimedia data into an HTML form. Hence, data from various magnetic stripe readers and scanners may be stored into an HTML form. Moreover, pen strokes, including signature strokes, may be captured into the HTML form. Additionally, the capturing of voice, image and video data are supported. The user needs not relearn the interface for each application, as the interface remains consistent across a plurality of platforms. Hence, user productivity is increased.

Further, from the point of view of writing an application using HTML, the capture of these multimedia data may be specified in a simple, yet robust manner by adding an additional attribute to an HTML tag to enable an input field to support the multimedia data. By integrating such data capture capability into an HTML input field, it is easy to integrate with existing HTML development environments so that an HTML developer may easily deploy the data capture capability. Further, as the capability is standardized, developers can avoid a need for developing specialized routines and code on a case by case basis.

DESCRIPTION

Figure 1:
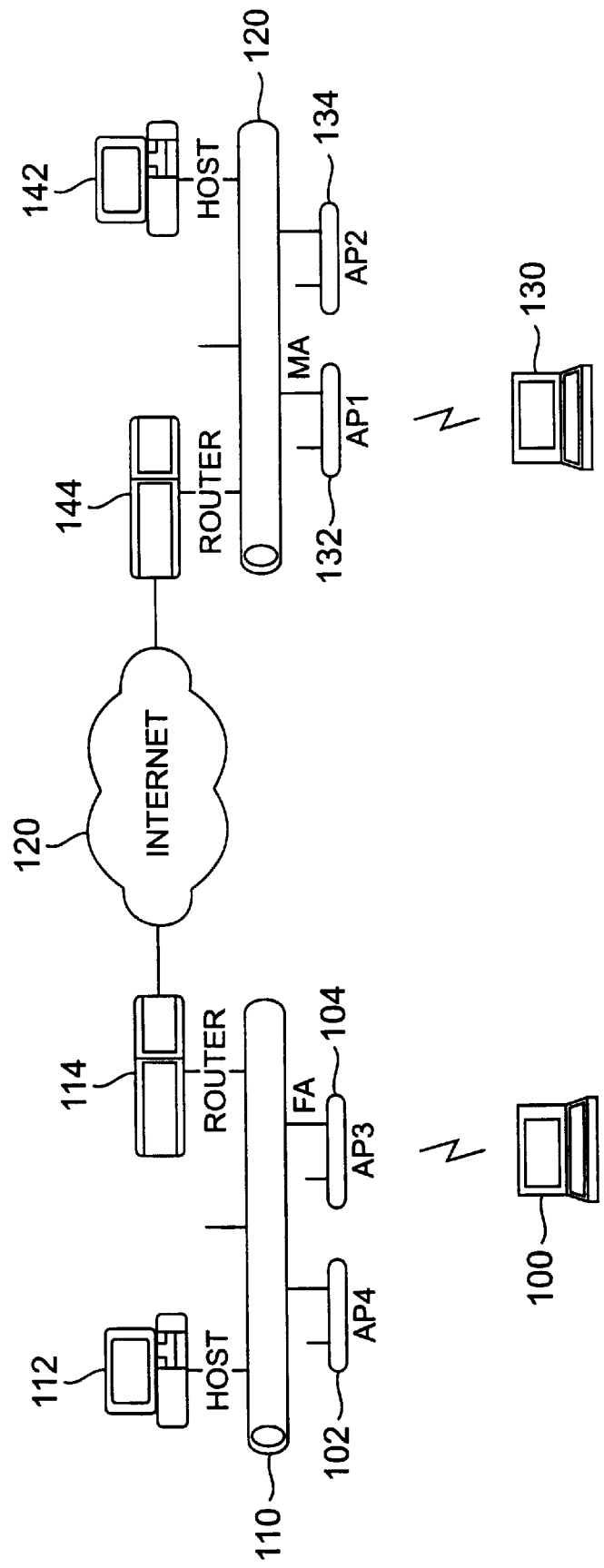
FIG. 1 is a schematic illustration of a networked system according to one embodiment of the invention.

Referring to FIG. 1, a data communications network according to one embodiment of the invention is illustrated. One or more mobile nodes 100 wirelessly communicate with a plurality of base stations or access points (APs) 102 and 104. The APs 102 and 104 in turn are connected to a LAN 110. The APs 102 and 104 may be either LAN interface cards or standalone devices that transmit LAN traffic between the wired and wireless portions of the network. The physical area over which an access point can transmit wireless communications is called a cell. RF based solutions may be limited in their transmission range in order to conserve energy. Infrared solutions, like light, cannot penetrate opaque barriers. Thus, even with a diffused infrared system, a cell may be limited to a single room. To provide greater coverage, multiple cells in a network may be linked to provide the mobile node with an ability to freely roam from cell to cell.

Attached to the LAN 110 is a host computer 112 and a router 114. The router 114 receives packets from the LAN 110 and routes the packets to a second router 114 over the Internet 120. The Internet 120 represents a shift in communications technology, for data packets may be sent between routers 114 and 144 over long distances crossing state and even national boundaries at essentially fixed costs. Once the data packets are received by the router 144, the data packets in turn are transferred into a second LAN 140. Attached to the second LAN 140 is a host computer 142 as well as a plurality of base stations or APs 132134. The base stations 132–134 in turn communicate via wireless link to a second mobile node 130.

In one embodiment, the mobile nodes 100 and 130 may be laser-scanned, bar code readers of the hand held, battery-operated type as disclosed in U.S. Pat. Nos. 4,387,297, 4,409,470 or 4,760,248, all assigned to Symbol Technologies, Inc., and hereby incorporated by reference. Additionally, the mobile nodes 100 and 130 may be of the type disclosed in Application Ser. No. 08/916,605 entitled "HAND-HELD OPTICAL READER TERMINAL WITH ERGONOMIC DESIGN", filed on Aug. 22, 1997, assigned to Symbol Technologies, Inc., and hereby incorporated by reference. Various other types of remote terminals or hand held computers may also be used. These remote terminals ordinarily would include data entry facilities such as a keyboard, as well as a display or a hard copy device for indicating information to a user. Although hand held, laser-scan type bar code readers are mentioned, the mobile nodes 100 may also be bar code readers of the wand type. Further, the mobile nodes 100 and 130 may be an optical character recognition (OCR) type as well. Other types of data may be gathered by the mobile nodes 100 and 130, including temperature or pressure measuring devices, even counters, voice or sound activated devices, and intrusion detectors, among others.

The mobile nodes 100 and 130 can communicate with base stations 102, 104, 132 and 134 using a wireless network such as a Spectrum-24 wireless LAN, available from Symbol Technologies, Inc. The wireless network may be a frequency-hopping spread spectrum cellular network designed to operate within a 2.4–2.5 gigahertz (GHz) band. Additionally, to ensure interoperability, the network may conform to various wireless LAN standards, including an IEEE 802.11 standard. The IEEE 802.11 standard is designed to provide interoperability between mobile clients and wireless LAN access points from different vendors. The standard covers Direct Sequence Spread Spectrum (DSSS), which spreads parts of a message across the available frequency range; Frequency Hopping Spread Spectrum (FHSS), which transmits a short burst on one frequency, then hops to another frequency for the next burst; or infrared technology as the physical transport layer in the 2.4 GHz band. A main objective of the standard is to enable interoperability at the physical layer between mobile clients and access points using the same transmission technique. Because the protocols that allow for seamless roaming among cells are beyond the scope of the standard, customers will need to rely on a single manufacturer for their access points and software that handles roaming, even though the IEEE 802.11 standard will let them use other vendors' PC mobile adapters to communicate between mobile clients and access points.

Figure 2A:
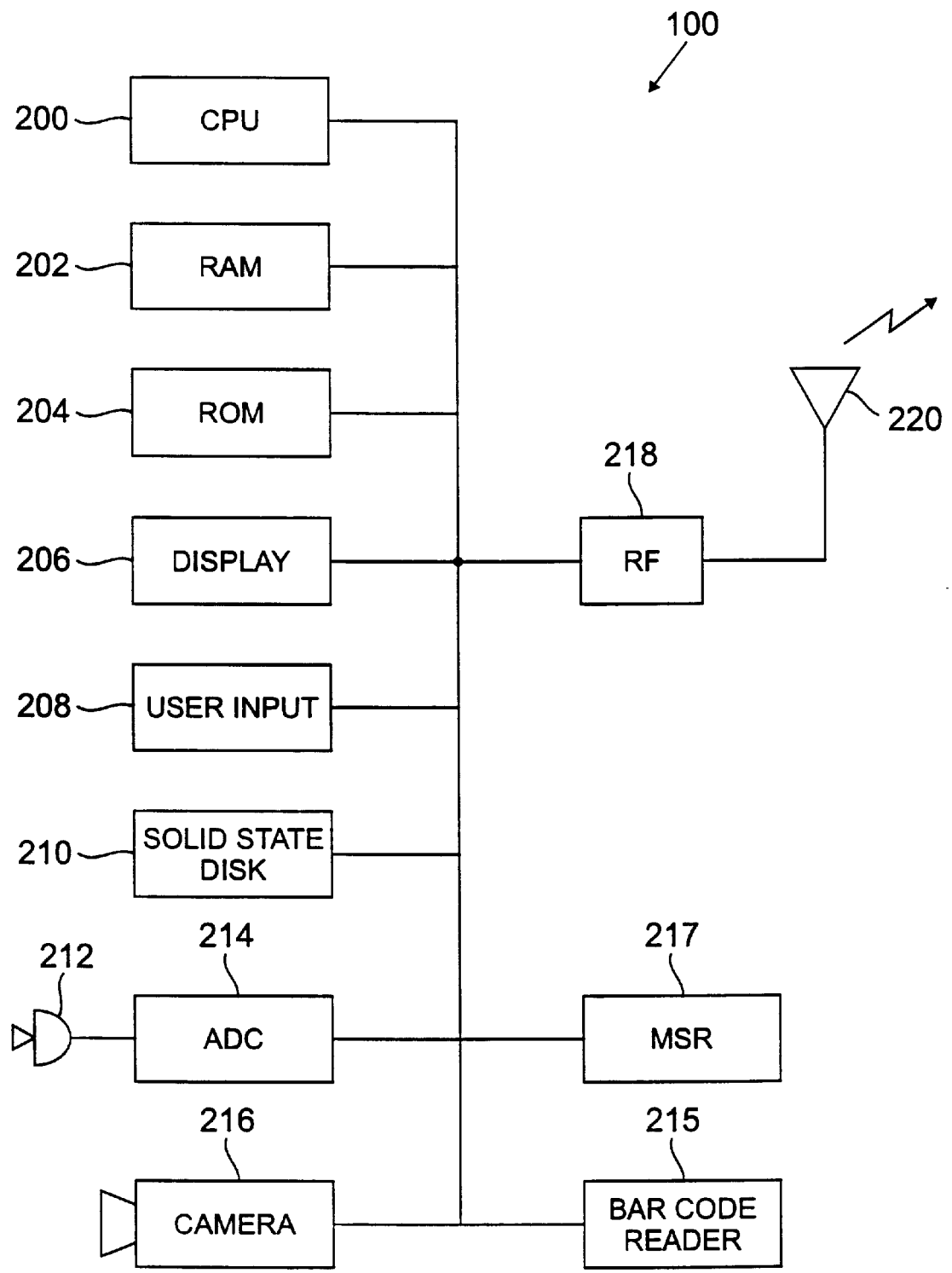
FIG. 2A is a schematic illustration of a mobile node of FIG. 1.

Referring now to FIG. 2A, a schematic diagram of the mobile computer 100 is illustrated in more detail. The computer 100 has a central processing unit (CPU) 200 which is connected over a bus to various memory devices, including a random access memory (RAM) device 202 and a read-only memory (ROM) device 204. Additionally, the CPU 200 is connected to a display device 206. The display device 206 may suitably be a liquid crystal display (LCD) device, an array of light-emitting diodes (LEDs), or a hard copy device such as a printer. Moreover, the display device 206 may have a touch sensitive screen.

Additionally, one or more manual input devices 208 such as a pen or stylus, a mouse and a keyboard may be connected to the CPU 200. Alternatively, an optional pop-up keyboard may be provided to appear on the touch-sensitive screen of the display 206. The pop-up keyboard provides a selection of soft keys on the screen which emulates a standard keyboard in order to allow keyed data entry without requiring an external keyboard. Using the pop-up keyboard, the user simply taps the desired soft key with the pen.

To buffer large quantities of data, a solid state disk 210 may be connected to the CPU 200. The solid state disk 210 may be used to buffer voice input or video input, among others. The voice input is captured by a microphone 212 whose output is digitized by an analog to digital converter (ADC) 214. The output of the ADC 214 is provided to the CPU 210 for processing. A camera 216 may also be provided to capture still images or video sequences and to provide the images to the CPU 210 for analysis as well as the solid state disk 210 for storage.

Further, to provide automatic data capture capability for various inventory and point-of-sale applications, among others, a bar code reader 215 and a magnetic stripe reader 217 are connected to the CPU 200. The bar code reader may be laser-based and may be of any type well known in the art which generates a visible beam and scans the beam across a bar code with an oscillating mirror or like device. Such a bar code reader may use a photodiode to detect the scanned beam which is reflected off the bar code and provides the detected signal for subsequent processing and decoding to generate data indicative of the target bar code. Alternatively, a charge coupled device (CCD) type scanner may be used. The CCD type scanner shines a sheet of light onto the target bar code and detects a reflected signal with a linear CCD array for capturing the bar code information.

The magnetic stripe reader 217 reads data from magnetically encoded cards in accordance with several standards. In one standard, an ANSI/ISO standard, 3 tracks are defined, each of which is used for different purposes. These tracks are defined only by their location on the magnetic stripe, since the magnetic stripe as a whole is magnetically homogeneous. Although the magnetic stripe reader 217 is preferably a triple track device, it may also be a single and dual track devices which allow reading a wide range of data, including ANSI/ISO format cards including credit/debit cards and driver licenses. Particularly, with the magnetic stripe reader 217, card data may be converted to keyboard scan codes or serial data stream for transmission to the CPU 200. Moreover, an auto detection capability from the CPU 200 allows a full keyboard to be emulated, thus avoiding the requirement that a keyboard be attached. Collectively, the user input device 208, the microphone 212, the camera 216, the bar code reader 215, and the MSR 217 may each be generically referred to as a transducer for capturing a specific data type.

The CPU 200 is also connected to an RF transceiver 218 for transmitting and receiving data using a wireless LAN. The RF transceiver 218 is connected to an antenna 220 for transmitting data to the one or more APs 102, 104, 132, or 134. The wireless LANs use infrared (IR) or radio frequency (RF) transmissions instead of a physical connection. Infrared transceivers can use either a directed beam or a diffused infrared beam, while radio transceivers can use standard narrowband radio or one of two spread-spectrum schemes: Direct Sequence Spread Spectrum (DSSS), which spreads parts of a message across the available frequency range; or Frequency Hopping Spread Spectrum (FHSS), which transmits a short burst on one frequency, then hops to another frequency for the next burst.

Figure 2B:
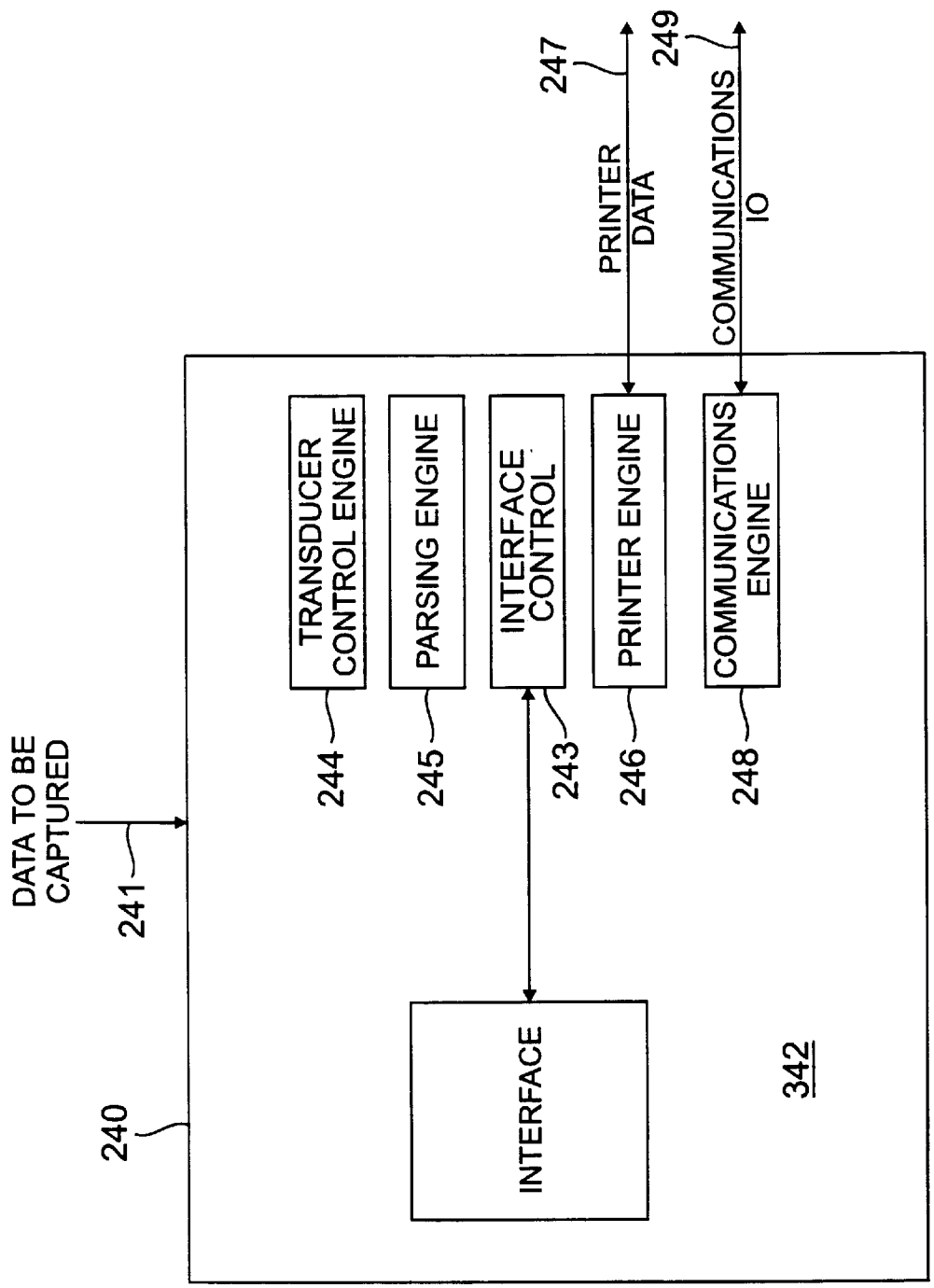
FIG. 2B is a schematic illustration of software modules executing on the mobile unit.

FIG. 2B shows various software modules on the mobile unit 100 in more detail. The system includes a browser 240 to which bar code information 241 is input. An interface 242 is constructed at run time and an interface control 243 is provided. The client browser 240 further includes a bar code and MSR acquisition engine 244, a parsing engine 245, a printing engine 246 with a printed data interface 267 and a communications engine 248 with a communications input/output interface 249. The user interacts with the interface via a further interface 250.

The client browser 240 executes on the mobile node 100 or 130 and provides a familiar user interface similar to the browser interface available on Netscape Navigator, available from Netscape Communications Corporation, or Internet Explorer, available from Microsoft Corporation for desktop computers. Accordingly, the browser has a graphical user interface with optional menus and icons across the top, along with an optional data entry bar to supply a universal resource locator (URL) that a user wishes the browser to retrieve. Moreover, a plurality of navigation buttons allow the browser to guide the user through previously viewed pages either in a page forward or a page backward fashion. A history button and a bookmark button may optionally be provided to further enable the user to navigate the Web.

When the user enters URLs manually or by clicking on hyperlinks, the user instructs the browser to locate an appropriate computer that houses the Web document, and via HTTP, requests the document and downloads it onto the mobile node 100 or 130. While the browser receives data from a server, the browser translates the information into text, hyperlinks, and pictures. The process of reading a web page for pertinent information—either instructions or text to be displayed—is called parsing. Any images, buttons, or icons referenced by the URLs are retrieved and loaded by the browser.

After the user types in a URL or clicks on a hyperlink, a document retrieval process begins using the mobile node 100 or 130 communications software and TCP/IP. First, TCP/IP opens a connection between a client, in this case the mobile node 100 or 130, and a host computer, in this case, the host computer 142. The browser software running on the mobile node 100 or 130 generates a few lines of text called a request header, asking the server computer 142 for a specific hypertext markup language (HTML) document. The request contains the protocol to be used as well as the location of the linked document. The TCP software on a computer then attaches a header to the data packet indicating the protocol, among other information. The protocol may be HTTP. The request header is then sent to the Internet Protocol, which then routes the TCP packets to the host server using other data and network protocols. TCP/IP is essentially an outer shell of a data packet, and more specialized protocols, such as HTTP, Gopher and FTP may be used as an inner core. The TCP software and the host computer reads each packet's header, reassembles the data into one piece, and directs the data to a TCP/IP port. On a server, there may be a very large number of ports or pathways for incoming information. The server software that is designed to handle the specified protocol receives the data and executes any tasks requested such as document retrieval. The response is then sent in TCP packets from the server back to the client. The server's TCP software breaks the data into packets and puts headers onto each one. The packets are individually routed back to the client using the Internet Protocol as well as other data and network protocols. When the response reaches the client, it is still in many different packets. A process of reconstructing the packets into a single group of data is eventually handled by the client's transport and session layers. This process is known as demultiplexing. The browser then looks at the assembled response data and determines what information it should display and what it should read for formatting or other instructions.

While the packets are being reassembled into the document, the browser on a mobile node parses the HTML document. Each document may be parsed into a head section and a body section. The head and the body of the document are delineated by a pair of <HEAD> and </HEAD> tags and a pair of <BODY> and </BODY> tags, respectively. The head provides header information on the document, such as a title and other descriptive information such as a description of the software generating the HTML document. The body is the primary section where the HTML document is defined. Tags that can appear in the body can designate a formatting of paragraphs, lines, characters, graphics, lists, forms, frames and layers, among others.

Particularly, one HTML tag called "INPUT TYPE" is extended in order to support Web-based magnetic stripe reading capability as well as signature capture capability. A convention to invoke the magnetic stripe reading capability for a current data input field is as follows:

<INPUT TYPE="TEXT" STIMSR [=T1, T2,T3 ] . . . > where

STIMSR is a parameter that enables magnetic stripe data capture for a text input field. This attribute parameter is required.

T1 is a value parameter that places any read data from Track #1 of the magnetic card into the input field. The contents of the input field are cleared before Track #1 data is placed in the field. This parameter is optional.

T2 is a value parameter that places any read data from Track #2 into the input field. Track #2 data is appended to any existing data from a previous track. This parameter is optional.

T3 is a value parameter that places any read data from Track #3 into the input field. Track #3 data is appended to any existing data from previous tracks. This parameter is optional.

In this convention, parameters T1–T3 may be omitted, which enables all three tracks for the input field as shown below:

<INPUT TYPE="TEXT"0 STIMSR . . . >

Moreover, omitting an optional parameter's data does not prevent the parameter from being read by the magnetic stripe reader 217. It simply prevents the data from being displayed in the input field. It does not prevent the parameter from being transmitted to the host computer.

The data transmitted to the host computer is delimited by a predetermined delimiter. For instance, if the delimiter were '|', the data transmitted to the host may appear as follows:

fldCreditCard="379285238901001|James Trevor Brooks|0398"

where Track #1 contains the card number: 37928523890100

Track #2 contains the card holder's name: James Trevor Brooks; and

Track #3 contains a card expiration date: August 1998 (0898).

In this manner, a regular input type text field which is a normal form object in the standard HTML language is extended to include an additional attribute for the HTML object to tell the browser on the web client that it can collect magnetic stripe reader data from a reader, if a reader is active. The STIMSR attribute will be ignored by conventional web browsers such Netscape Navigator and Microsoft Internet Explorer.

The extension to the HTML language is illustrated in more detail by considering exemplary HTML code for accepting credit card information generated by the MSR 217 into an HTML form. The HTML code is shown below:

```
<!DOCTYPE HTML PUBLIC"-//IETF//DTD HTML//EN">
<html>
<head>
<meta http-equiv="Content-Type"
content="text/html; charset=iso-8859-1">
<title>Enter Credit Card Information</title>
</head>
<body>
<p align="center"><font size="4">Enter Credit Card Information</font></p>
<form method="POST">
   <p align="center">Swipe Customer's Card:<br>
   <input type="text" size="20" name="fldCard" stimsr="T"1></p>
   <p align="center"><input type="submit" name="B1" value="Submit Card Information"><br>
   <input type="reset" name="B2" value="Clear Card Information"></p>
</form>
</body>
</html>
```

Figure 3:
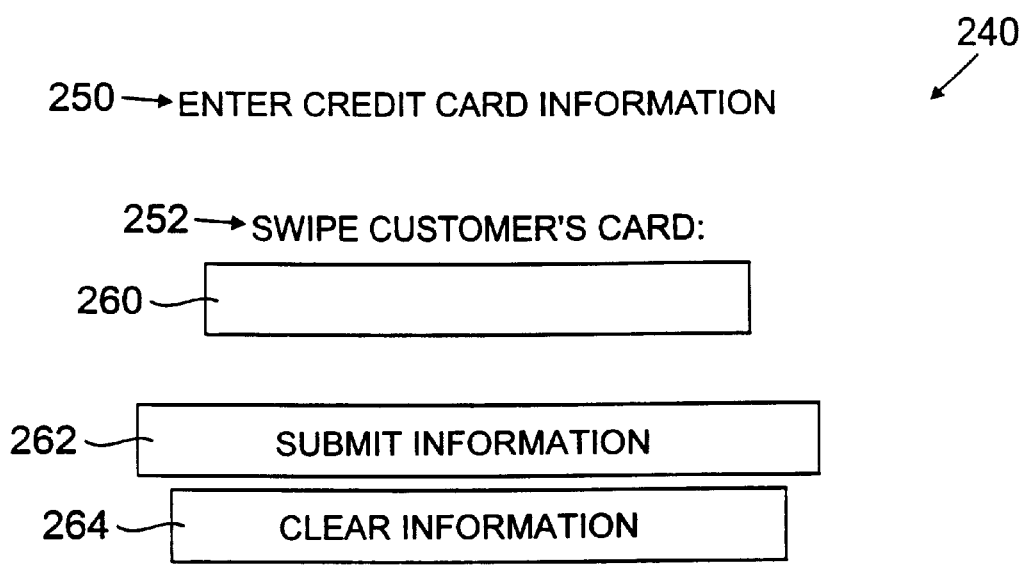
FIG. 3 is an illustration of a page rendered in accordance with a hypertext markup language (HTML).

An output generated by the above HTML code commonly viewed in the client browser is rendered in FIG. 3. The output is center-aligned and has text strings 250–252 for communicating messages to the user. Moreover, a magnetic and stripe reader enabled data entry field 260 is provided. In one implementation, because the field 260 is the first field, it automatically is in "focus", as explained in more detail below. Alternatively, when a suitable user input device 208 such as a pen 208 is positioned in the data entry field 260, the field 260 may also be in focus.

Further, a plurality of buttons 262 and 264 are provided for the user to either submit the collected information to the hosting Web server or to clear the collected information, respectively. In this manner, a magnetic stripe reader enabled browser displays an input text box for the user to select. When a blinking input cursor is positioned in the field 260, the user may run any card with a magnetic stripe through the MSR 217 to collect data encoded on the card into the field 260.

The focus for data entry may be obtained in various ways; for example, by the user selecting the field 260 with the pen, by default upon an initial loading of the form 250, by default after data has been entered into a previous record, by a command button control being touched by the pen, or by the input object being the next control in a tap selection when an optional keyboard is used.

In a similar manner, for bar code reading, the input text object has an additional attribute which tells it that when the input field has an input focus, data generated by the barcode reader will be placed into the barcode enabled input field.

Figure 4:
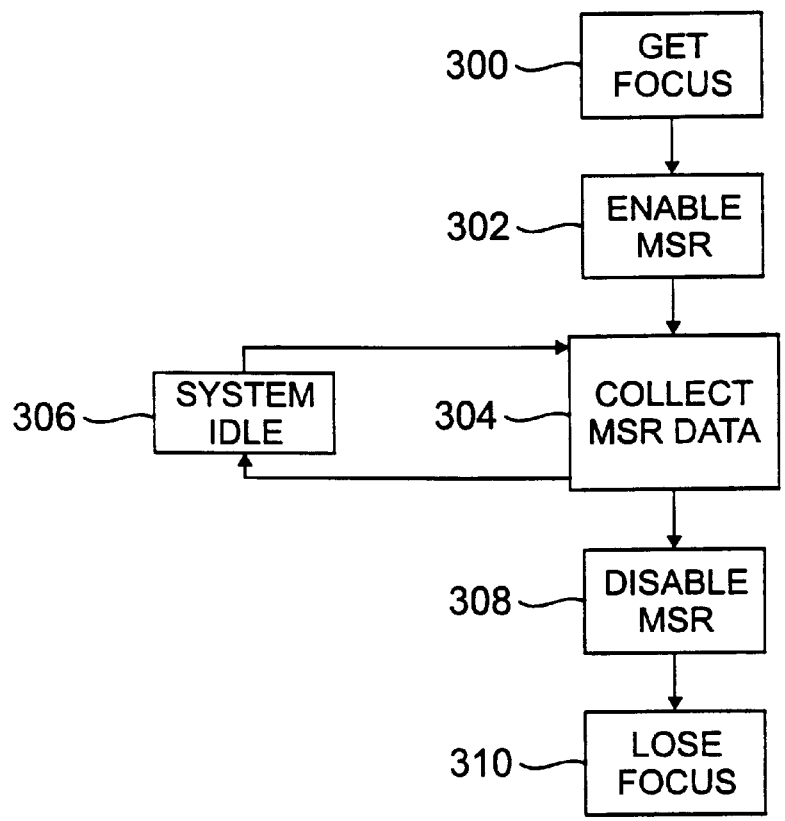
FIG. 4 is a flowchart of a process for activating a magnetic stripe reader to collect data into an HTML form.
Figure 5:
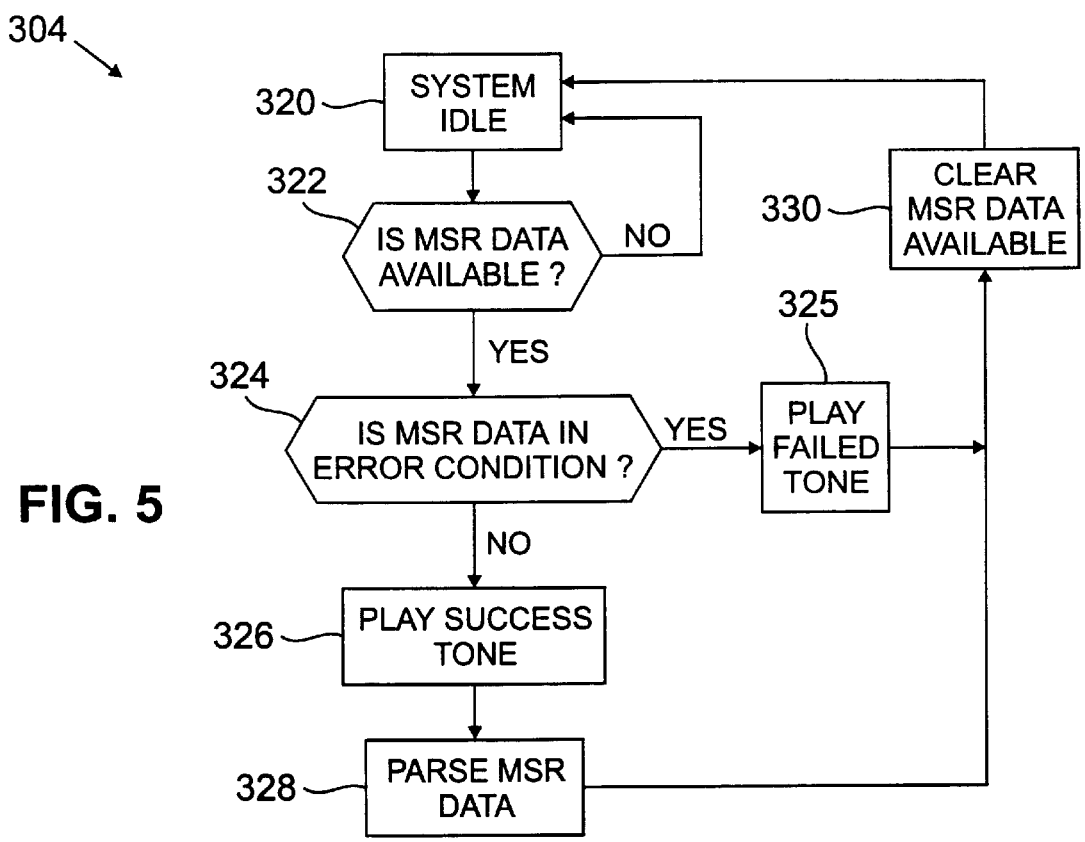
FIG. 5 is a flowchart of a process showing the magnetic stripe reader data collection process.
Figure 6:
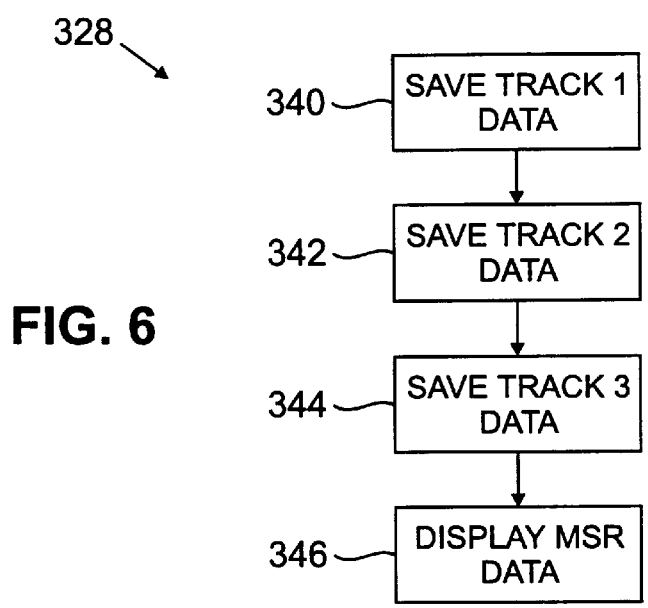
FIG. 6 is a flowchart illustrating a process for parsing data generated by the magnetic stripe reader.
Figure 7:
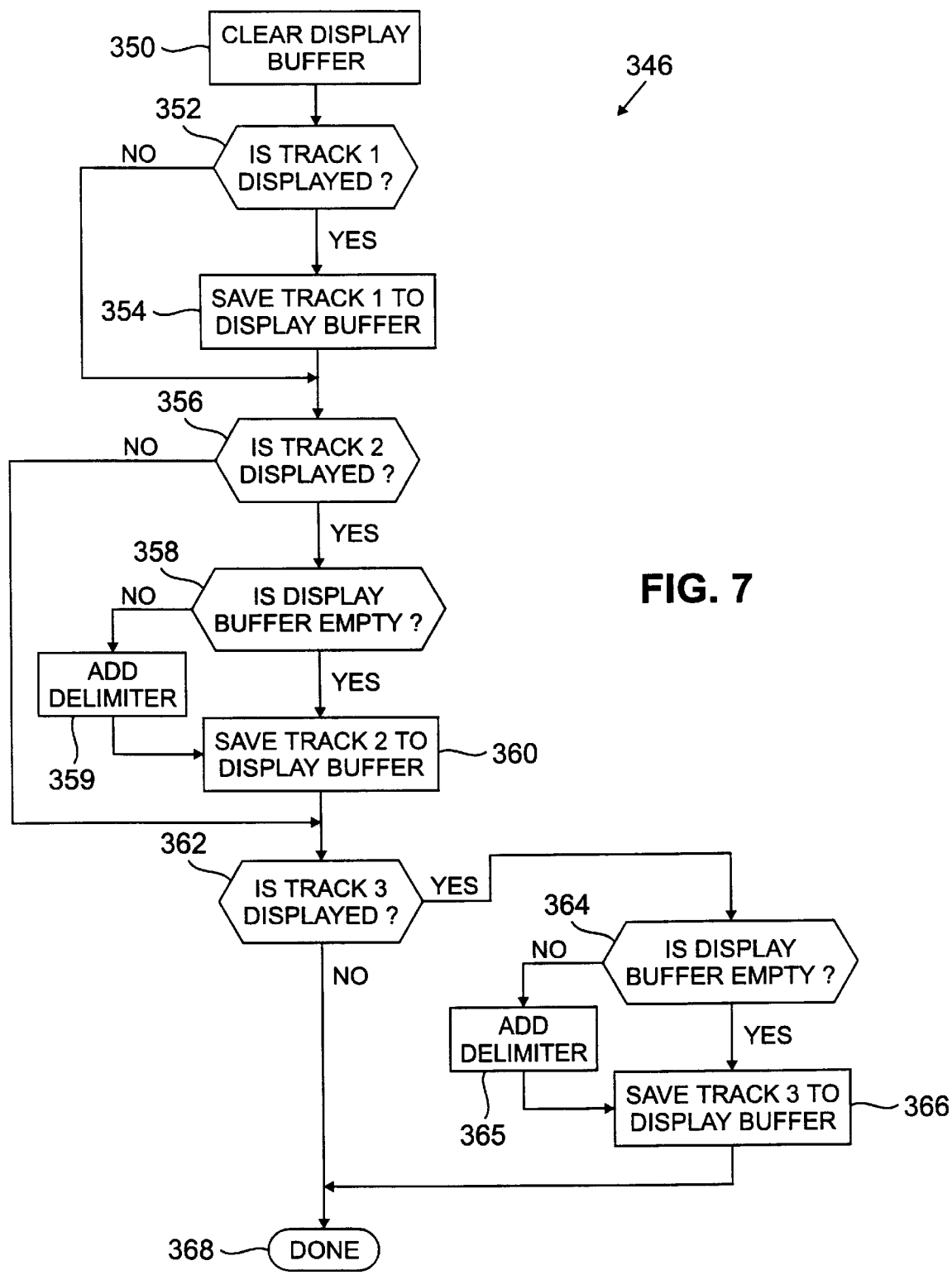
FIG. 7 is a flowchart illustrating a process for displaying the magnetic stripe reader data.

The data collection process on a magnetic stripe reader enabled browser is shown in more detail in FIG. 4, and further shown in FIGS. 5–7. In step 300 of FIG. 4, a current focus is obtained whenever an input cursor is placed inside a particular input box, such as the input field by either a pen touch into the input box or a tab key that will take it into the input box or a programmatic method that sets the focus to the input box. After focus has been obtained in step 300, the MSR 217 is enabled in step 302. The enabling of the MSR 217 performs various register preprocessing necessary to set up the MSR 217. Upon pulling a magnetically coded card through the MSR 217, data may be captured by the browser form. From step 302, a system idle process 306 is executed. Every process in the system, including a process for collecting MSR data 304, is polled during the idle process 306. If nothing is occurring, the mobile node 100 or 130 remains in the idle process 306. Alternatively, if data is available for the input box, the MSR data collection process is performed in step 304. Once data has been collected, the user selects another object, causing the focus to be moved from the input field in step 310. For instance, the blinking input cursor may be moved to another input object. When this is the case, step 310 disables the post processing of the input box and disables the MSR 217 so that while the input box is not being focused on, data from the MSR 217 cannot be placed in the input box.

FIG. 5 shows in more detail step 304 of FIG. 4. Step 304 is invoked by a system idle process 320 when data which may have been read from the MSR 217 during a system idle time becomes available. If no events are occurring, the process of FIG. 5 simply returns to the system idle step 320. If data is available in step 322, the process proceeds to step 324 checks for an error condition. Typically, a checksum operation is performed on the retrieved data. If the checksum fails, an error condition is detected and an error tone is played in step 325 to indicate that a failure condition exists so that the user may retry the read operation. The contents of the data entry field do not change on an error. From step 324, the process proceeds to step 330 which clears an MSR data available flag to allow another read attempt by continuing to enable the MSR 217. If step 324 detects no error with the data, a successful tone is played in step 326 to indicate that data was read successfully. Next, the MSR data is parsed in step 328, which is shown in more detail in FIG. 6. Finally, the process of FIG. 4 clears the data available flag in step 330 and returns to the system idle mode in step 320.

Referring to FIG. 6, step 328 of FIG. 5 for parsing of the MSR data is shown in more detail. When the data is read from the card in step 304 (FIG. 4), the MSR 217 delimits the data with a delimiter such as a specific character. Typically, the output of the MSR 217 is placed in a string with Track 1 data, the delimiter, Track 2 data, the delimiter, and Track 3 data. The process of FIG. 6 thus examines the string, strips off the delimiter, and places the data into appropriate internal variables within an object representing the field input box. Thus, in step 340, Track 1 data is retrieved and saved. Similarly, in step 342, Track 2 data is saved. Finally, in step 344, Track 3 data is saved. The saved data is then displayed in step 346, which is illustrated in more detail in FIG. 7.

Referring now to FIG. 7, after the three pieces of data have been stored internally into a field object, the object is displayed. First, a display buffer associated with the display 206 is cleared in step 350. Next, in step 352, the process determines whether Track 1 data is to be displayed according to the parameters associated with the HTML INPUT TYPE tag. If Track 1 data is to be displayed, Track 1 data is copied to the display buffer in step 354.

From step 352 or 354, the process checks if Track 2 data is to be displayed in step 356. If so, the process further checks in step 358 whether the display buffer is empty. If not, a delimiter is added to the display buffer in step 359. The delimiter is added to separate Track 1 data, and subsequently in steps 359 and 365, to separate Track 2 data, and Track 3 data, respectively. In the event that Track 1 is not displayed, the display buffer is empty so the addition of the delimiter is not necessary. Thus, from step 358, Track 2 data is saved in step 360.

From step 356 or step 360, the process checks whether data on Track 3 needs to be displayed in step 362. If Track 3 does not need to be displayed, the process exits in step 368. Alternatively, if Track 3 data is to be displayed, the process further checks whether the display buffer is empty in step 364. If not, the delimiter is added in step 365. From step 364 or step 365, the process saves data associated with Track 3 to the display buffer in step 366 before exiting in step 368.

Generally, a three-part process is executed when the MSR data is provided to the HTML form which is designed to accept this data. First, unique information is submitted to the server for processing. Next, the server redirects the information to a common gateway interface (CGI) application that is called by the form "submit." The CGI scripts are activated by the server in response to an HTTP request from the client. Lastly, the CGI application may send form data to another computer program, such as the database, save it to a file, or even generate a unique HTML document in response to the user's request. Hence, the CGI application is essentially a program, while the CGI itself is a doorway through which a web server sends requests and the CGI application collects and returns data. CGI is a communications protocol by which a web server can communicate with other applications and is thus a standardized communication method between a CGI application and an HTTP server. The CGI application performs its processing on the data and then forwards the result to the server. If the web page resides on the same server, the server will deliver that web page to the client browser. Alternatively, if the web page resides on another server, the current server returns the URL to the client browser, which in turn sends a request to the correct server for the page. Although CGI is discussed, other interface methods may be used to collect client data and generate dynamic HTML output to clients.

Turning now to FIGS. 8–12, processes for collecting pen stroke data such as signature strokes are shown. The processes of FIGS. 8–12 operate on an extended INPUT TYPE tag which supports a web based pen stroke capture capability for capturing signatures, among others. The pen stroke capture capability extension modifies a conventional HTML image input form object to collect strokes of electronic ink and later transmit those strokes to a host computer for processing. An invocation convention for the extended INPUT TYPE tag appears below:

<INPUT TYPE="IMAGE" STIPEN[=x1,y1,x2,y2] . . . >

Where:

STIPEN is a parameter that enables electronic pen ink to be captured within the bounds of the image. The parameter disables a normal submit action associated with the image object. This attribute parameter is required; and x1,y1,x2,y2 are optional parameters describing an optional rectangle within the image for specifying a "CLEAR CONTENT" area. When this rectangle is pressed, the stroke contents are cleared. Thus, the optional CLEAR CONTENTS area allows the user to click an area of the image, and clear the current strokes stored.

Generally, each stroke is stored as an origin point, followed by a series of x and y deltas. Each x and y delta may be limited to a predetermined range, such as 15 points from a previous delta. Further, a delta of 0,0 indicates the end of the stroke. To minimize data storage and processing requirements, duplicate points and points along a straight line between two deltas are eliminated from the stroke list.

When strokes are sent to the host they take the following form:

fldSignature=nCount,OriginX0,OriginY0,x0y0x1y1 . . . xnyn, OriginX1,OriginY1,x0y0 . . .

Where nCount is the total number of strokes being sent to the host, and is a hexadecimal number from 0001 to FFFF; and OriginX and OriginY values are beginning coordinates of a stroke. They are positive hexadecimal numbers with a range between 1 and 0xFFFF. x and y are deltas, each within a predetermined range such as from −15 to +15. Alphabetic characters are used to represent the deltas. The number zero is represented by the character 0. Positive numbers are represented as capital "ABCDEFGHIJKLMNO", and negative numbers are represented as lower case letters "abcdefghijklmno". This scheme was chosen because alpha characters do not get translated to ISO-Latin when transmitted. It allows the fewest number of characters when transmitting the data to the host, using HTTP. A string of "00" terminates the stroke.

An example of a particular stroke data may appear as follows:

fldSignature="0002,002D,0030,CEDEDEDEJJMANONa00,00F3, 00 10,ghkk00"

The above exemplary signature has two strokes. The first stroke runs mostly in a positive direction, and the second stroke runs mostly in a negative direction. The first stroke has 8 xy pairs and one terminating pair, while the second stroke has just 2 xy pairs and a terminating pair. A comma exists as a delimiter between the end of the first stroke and the OriginX of the second stroke.

Figure 8:
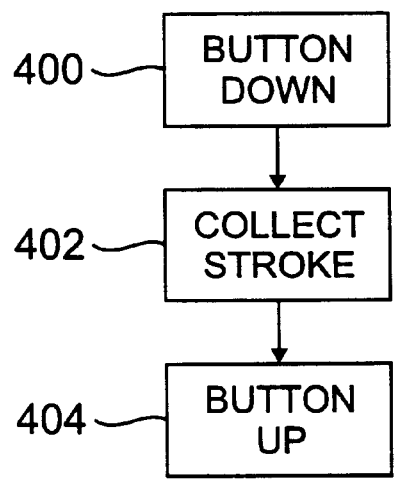
FIG. 8 is a flowchart illustrating a process for capturing stroke data from a user to an HTML form.

Referring now to FIG. 8, a process for collecting a single hand stroke from the user is shown. In step 400, a button down event is generated when the user input device 208 such as a pen is actuated inside of the image's rectangle box. Next, in step 402, the stroke is collected by watching pen movements while it is inside the image's rectangle. If the pen is moved outside the rectangle or if the pen is lifted while it is inside the rectangle, a button up event is generated in step 404.

Figure 9:
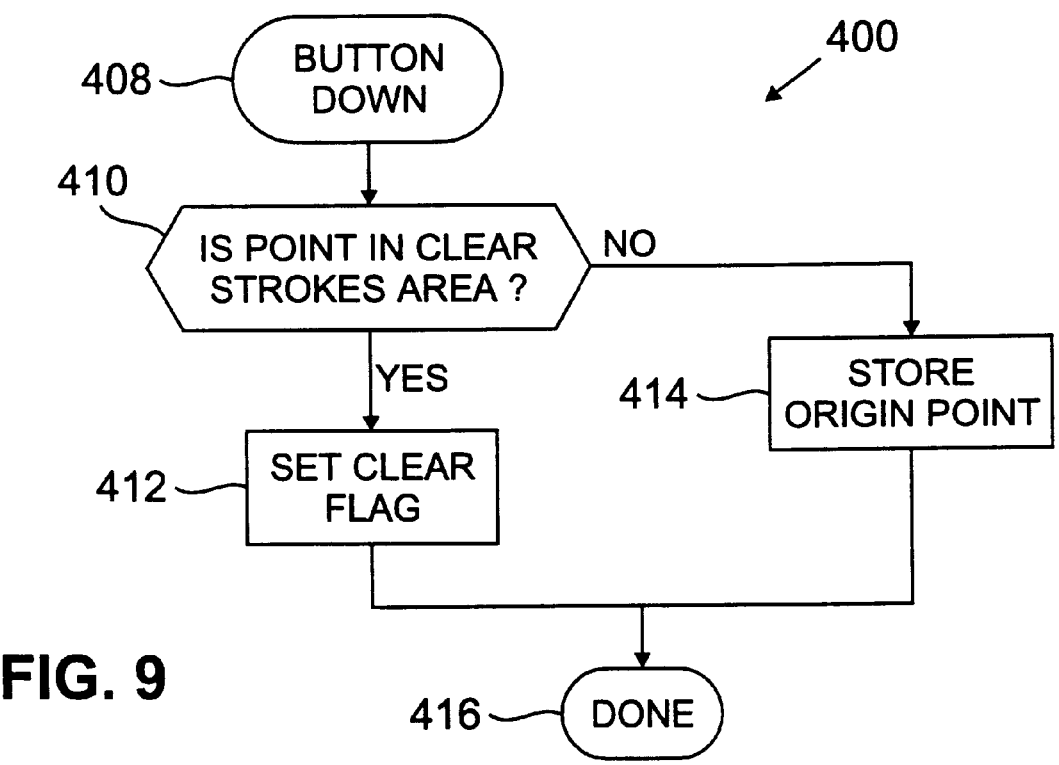
FIG. 9 is a flowchart illustrating in more detail a button down process of FIG. 8.

FIG. 9 illustrates step 400 in more detail. In step 410, the process examines whether the pen has been placed in an area designed for clearing strokes called a clear strokes area. If the pen is not in the clear strokes area, the process of FIG. 9 moves to step 414 where it stores the origin point of the stroke before exiting in step 416. Alternatively, in the event that the pen is in the clear strokes area, the process of FIG. 9 sets a clear flag in step 412. The setting of the clear flag eventually causes the stroke data to be erased. From step 412, the process of FIG. 9 exits in step 416.

Figure 10:
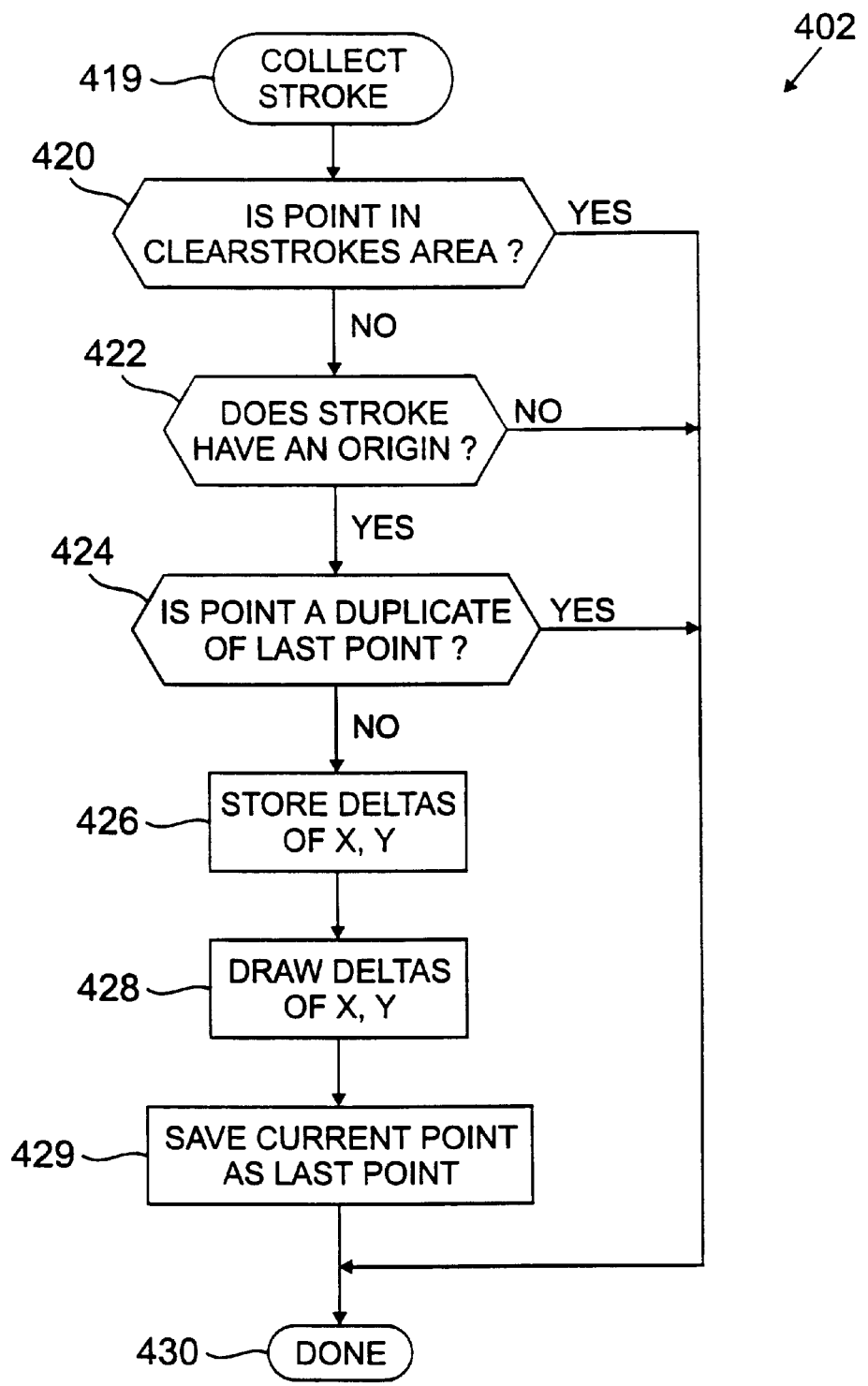
FIG. 10 is a flowchart illustrating in more detail a collect stroke process of FIG. 8.

Turning now to FIG. 10, step 402 of FIG. 8 is illustrated in more detail. First, the process checks whether the pen is in the clear strokes area in step 420. If so, the process simply exits in step 430. Alternatively, the process of FIG. 10 further checks if the stroke has an origin in step 422. If not, the process exits in step 430. Alternatively, the process further checks if the current point is a duplicate of the last point in step 424. If the point is a duplicate, the process exits in step 430. If the point is a new point, the process computes differences, or deltas, of the X and Y coordinates of the new point from the last point. Next, the new position is drawn using the X and Y deltas in step 428. Additionally, the current point is saved as the last point to prepare for the next stroke detection.

Figure 11:
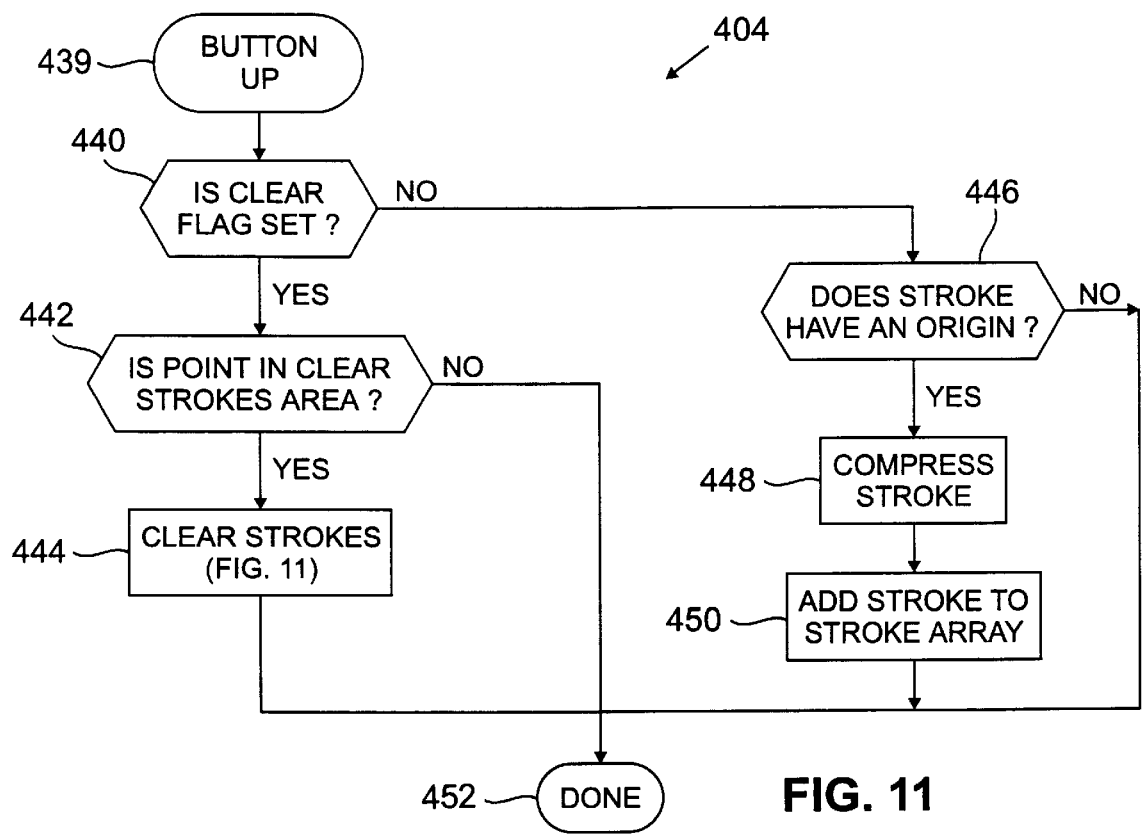
FIG. 11 is a flowchart illustrating in more detail a button up process of FIG. 8.

FIG. 11 illustrates in more detail a button up process which is represented as step 404 (FIG. 8). The button up process initially checks in step 440 whether the clear flag has been set in step 412 (FIG. 9). If so, the process further checks whether the current pen point is in the clear strokes area in step 442. If the pen point is in the clear strokes area, the process proceeds to step 444 where the stroke data is cleared. This order ensures that, if the pen originally went down on the clear strokes area and then were dragged off the clear stroke area before the pen was lifted, the stroke clearing operation will not be performed, as intuitively expected.

From step 440, if the clear flag has not been set, the process proceeds to step 446 where it checks whether the stroke has an origin. If so, the stroke data is compressed in step 448. The stroke compress process essentially determines whether the current point is on a straight line with the previously captured point. Since the straight line may be specified using two points, any unnecessary points along the line are eliminated. Points along the line that do not exceed ±15 units from the line are removed. The elimination of redundant points results in a compressed data structure, which in turn reduces the time required to transfer the data as well as to process the data. The compressed stroke data is then added to the stroke array in step 450. From step 442, 444, 446 or 460, the process exits in step 452.

Figure 12:
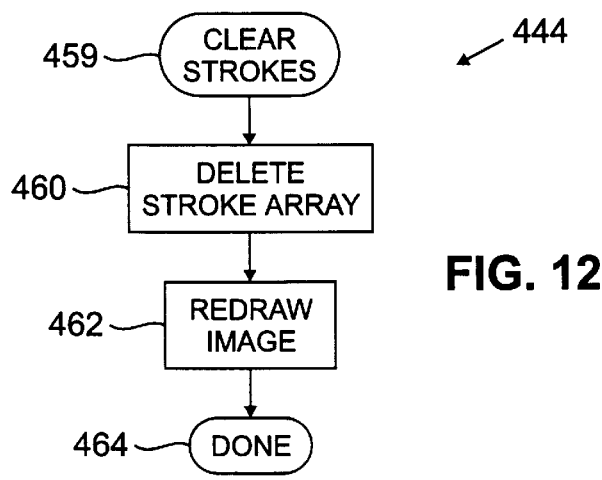
FIG. 12 is a flowchart illustrating in more detail a clear stroke process of FIG. 11.

Step 444 of FIG. 11 is detailed in FIG. 12. In this process, the stroke array which is maintained as an object which holds other complex objects such as stroke objects is deleted. The deletion of the stroke array frees the memory associated with the stroke array object. After the stroke array is deleted, the image on the HTML form is redrawn without any strokes on top of the image in step 462.

Figure 13:
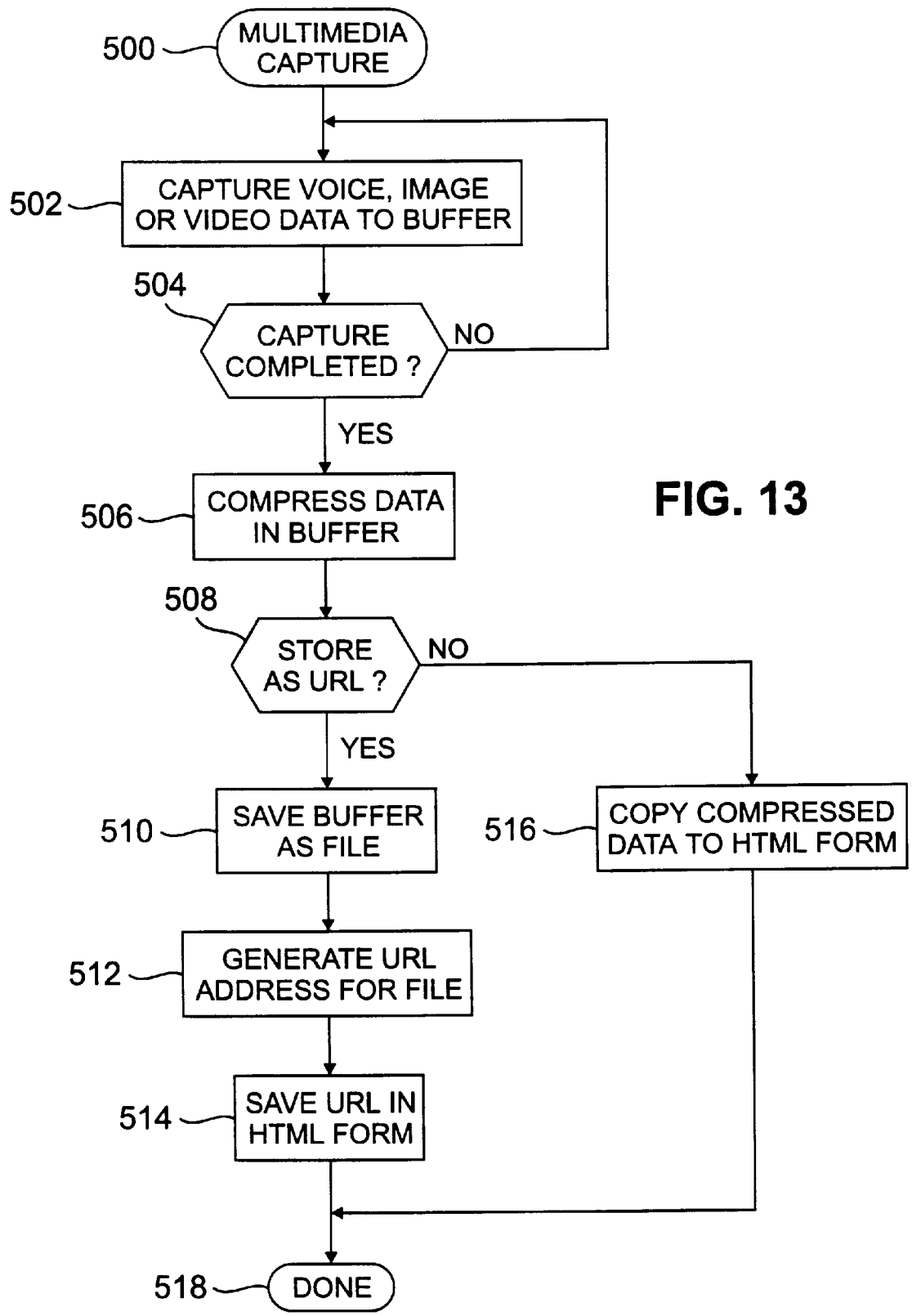
FIG. 13 is a flowchart of a process for capturing multimedia data such as voice, image or video data to the HTML form.

Turning now to FIG. 13, processes for collecting multimedia data such as voice, image, and video clip are shown. The processes of FIG. 13 operates on another extended INPUT TYPE tag which modifies a conventional HTML image input form object to collect multimedia data and later transmit the multimedia data to a host computer for processing. An invocation convention for the extended INPUT TYPE tag appears below:

<INPUT TYPE="MULTIMEDIA" STIMULTIMEDIA>

Where STIMULTIMEDIA is a parameter that enables sounds, images and video clips to be captured when an object on the form is selected. The parameter disables a normal submit action associated with the image object. This parameter is required.

Referring now to FIG. 13, a process for capturing multimedia data such as voice, image, or video data, is shown. A multimedia capture process 500 initially stores voice, image or video data captured by the microphone 212 or the camera 216 of FIG. 2 to a buffer. Next, in step 504, the process 500 waits until the capture process 502 has completed operation. If not, the process 500 loops back to step 502 to continue the data capturing process. Once the data capture step 502 has finished operation, the process 500 then compresses the data in the buffer in step 506. The data compression may be lossy or lossless. To maximize the compression ratio, the multimedia data may be compressed using the lossy method such as JPEG or MPEG.

From step 506, the process 500 determines an appropriate format for storing the data in the HTML form that invoked the multimedia data capture. If the data is to be stored as a pointer using an appropriate URL address, the process 500 proceeds from step 508 to step 510 where it saves the buffer as a file. Next, in step 512, the process 500 generates a URL address for the file saved in step 510. Finally, the URL address is stored in the HTML form for subsequent retrieval before exiting in step 518. Alternatively, in the event that the compressed data is to be stored in the form itself, the process moves from step 508 to step 516 where it copies the compressed data to the HTML form using a format similar to that discussed for storing captured stroke data. Alternatively, the data file may be transmitted first as an HTTP file, and the form containing other data may be subsequently transmitted to the server. When customized data from a form arrives at the server, it is redirected by the server to a CGI application through the CGI.

Although the custom input specifications have been described with reference to the HTML language, it is equally useful when configured to be used in other graphical user interface development environments such as Visual Basic for Windows and the like.

Moreover, it is contemplated that the custom input fields may be used in any operating environment which is configured to process both automatic data entry, including magnetic stripe reader data entry, penstroke data entry, voice data entry, image data entry and video sequence data entry. Thus, by configuring the custom input field to interface with a desired automatic data entry device, the custom input control provides a simple application development across a multitude of operating systems and environments.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or h more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

What is claimed is:

1. A computer implemented method for capturing data from a user into an input text field of a form object specified in accordance with a markup language, comprising:

selecting a nontext data type to be captured;

enabling a transducer associated with the selected nontext data type;

capturing nontext data from the transducer;

formatting data from the transducer using a predetermined format; and storing and displaying the formatted data in an input text field of a form object specified in accordance with a markup language, wherein the form object is adapted for handling the formatted data from the transducer.

2. The method according to claim 1, wherein the transducer is a magnetic stripe reader, further comprising capturing magnetically encoded data.

3. The method according to claim 1, wherein the transducer is a graphics tablet, further comprising capturing handwriting data.

4. The method according to claim 3, wherein the formatting step converts the handwriting data into one or more line vectors.

5. The method according to claim 1, wherein the transducer is a microphone, further comprising capturing audio data.

6. The method according to claim 1, wherein the transducer is a camera.

7. A method according to claim 5, wherein the formatting step converts the data into an encoded video data stream.

8. A method for capturing data from a transducer into an input text field of a form object specified in accordance a markup language, comprising:

determining whether a focus has been placed on a transducer aware input text field in a form object specified in accordance a markup language, wherein the form object is adapted for handling the formatted data from the transducer;

enabling the transducer to collect data;

collecting the nontext data from the transducer;

formatting and saving the data generated into the field; and disabling the transducer;

wherein the form object is adapted for handling the formatted data from the transducer.

9. The method of claim 8, wherein the data collecting step further comprises determining whether the data received is error-free and if not, generating a failure warning to a user.

10. The method of claim 9, wherein the generating step further comprises playing a first tone to indicate the failure and a second tone to indicate success.

11. The method of claim 8, further comprising:

saving the data into a predetermined format in the form; and displaying the data to a user.

12. The method of claim 8, wherein the data collecting step further comprises collecting one or more user strokes.

13. The method of claim 12, wherein the form has a clear stroke area in the form, comprising determining whether the user stroke is in the clear stroke area and if so, deleting previously stored user strokes.

14. The method of claim 12, wherein the stroke collecting step further comprises deleting duplicate points in the user stroke.

15. The method of claim 12, wherein the stroke collecting step further comprises storing deltas between previous and current user strokes.

16. The method of claim 12, further comprising compressing the strokes.

17. An apparatus for capturing data from a user into an input text field of a form object specified in accordance with a markup language, comprising:

a processor;

a display unit coupled to the processor;

one or more transducers coupled to the processor, each transducer adapted to generated a predetermined nontext data type; and code for selecting and enabling one of the transducers, the code further formatting data from the transducer using a predetermined format and storing the formatted data in an input text field of a form object specified in accordance with a markup language, wherein the form object is adapted for handling the formatted data from the transducer.

18. The apparatus of claim 17, wherein the markup language is a hypertext markup language.

19. The apparatus of claim 17, further comprising a wireless transceiver coupled to the processor for communicating data.

20. The apparatus of claim 19, further comprising an access point adapted to receive data from the wireless transceiver.

21. The apparatus of claim 17, wherein the code further comprises code segment for determining whether the data received is error-free and if not, generating a failure warning to a user.

22. The apparatus of claim 17, wherein the code further comprises code segment for collecting one or more user strokes.

23. The apparatus of claim 22, wherein the code further comprises code segment for determining whether the user stroke is in a clear stroke area and if so, deleting previously stored user strokes.

24. The apparatus of claim 22, further comprising code segment for deleting duplicate points in the user strokes.

25. The apparatus of claim 8, further comprising code segment for compressing user strokes.

26. A method in a computer system for providing for entry of data in a mobile wireless computer unit for communication over a wireless data communications network from a transducer associated with the mobile unit, the mobile unit including a display and executing a display program having a graphical user interface using a markup language that enables hypertext documents to be portable from the platform to another comprising the steps of:

a) detecting in the mobile unit if the user has selected a nontext data source selected from a group including a bar code reader and a microphone;

b) determining the nontext data source that the user has selected;

c) receiving nontext data from the transducer corresponding to the selected source;

d) converting such nontext data into a predetermined format depending upon the selected source;

e) representing such data in an input text field of an object appearing in the display in the hypertext document, wherein the object is specified in accordance with a markup language and is adapted for handling the formatted data from the transducer.

* * * * *

UNITED STATES PATENT AND TRADEMARK OFFICE
CERTIFICATE OF CORRECTION

PATENT NO. : 6,178,426 B1
DATED : January 23, 2001
INVENTOR(S) : John Raymond Klein and Joel Kahn Page 1 of 1

It is certified that error appears in the above-identified patent and that said Letters Patent is hereby corrected as shown below:

Column 4,
Line 29, "132134" should be -- 132-134 --.

Column 8,
Line 8, "<INPUT TYPE="TEXT"0 STIMSR...>" should be
-- <INPUT TYPE="TEXT" STIMSR...> --.
Line 19, "fldCreditCard="379285238901001/James Trevor Brooks/0398" should be
-- fldCreditCard="37928523890100/James Trevor Brooks/0898 --.
Line 52, "T"1></p>" should be -- "T1"></p> --.

Column 13,
Line 65, after "or" delete "h".

Column 15,
Line 26, "generated" should be -- generate --.

Signed and Sealed this

Sixteenth Day of April, 2002

Attest:

JAMES E. ROGAN
*Attesting Officer*  *Director of the United States Patent and Trademark Office*